UNITED STATES PATENT OFFICE.

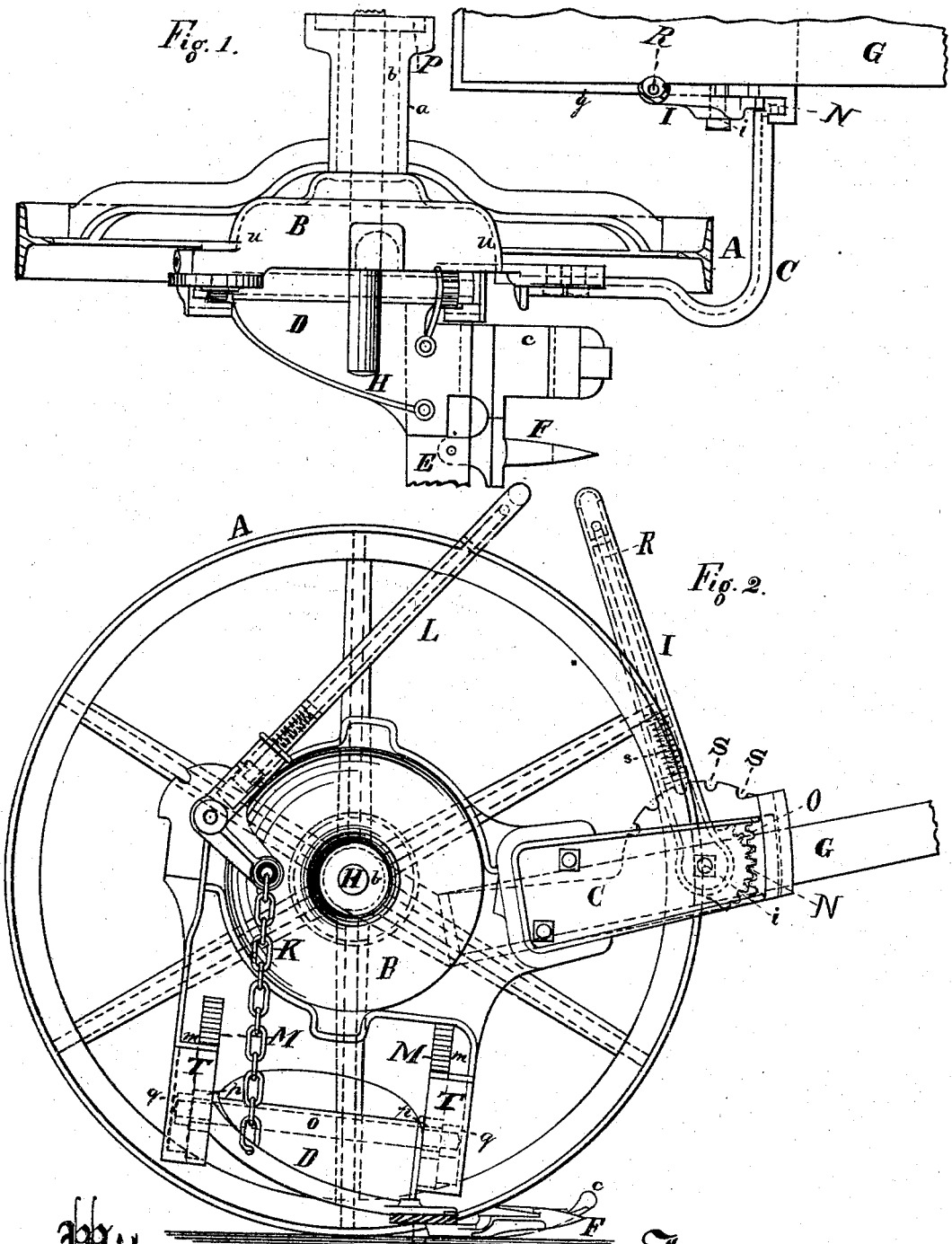

RUFUS DUTTON, OF YONKERS, NEW YORK.

IMPROVEMENT IN MOWING-MACHINES.

Specification forming part of Letters Patent No. 182,807, dated October 3, 1876; application filed February 11, 1876.

*To all whom it may concern:*

Be it known that I, RUFUS DUTTON, of Yonkers, in the county of Westchester and the State of New York, have invented a new and useful Improvement in Harvesting-Machines, of which the following is a specification:

My invention relates to a new and improved gear and finger-bar frame, and also to a new and improved method for turning the points of the fingers, so as to change the angle of cut, and thereby vary its height. They are applicable to that class of machines in which the finger-bar extends out from the side of the driving-wheel nearly under its center. The frame is placed outside of the driving-wheel, and is mainly supported by the axle.

The accompanying drawings will show my improvement as applied to a mowing-machine, Figure 1 representing a plan view, Fig. 2 a side elevation.

Those parts only of the machine necessary to illustrate the subject-matter claimed will be described.

A is the driving-wheel, a its hub. B, with its hub b and its projecting arms T T, is what I term the gear and bar frame. C is a brace-arm, which connects the frame B with the pole-frame g. The frame B is supported upon the axle H, which extends out beyond the hub of driving-wheel, as shown at H, Fig. 1. On the front side of gear-frame B is a projecting socket, into which is bolted the brace-arm C, the other end of which may be connected either rigidly or with rack and gear to pole-frame g— in this instance is connected by a rack and gear, for purposes hereinafter described. The brace-arm C holds the frame B from turning on the axle. The two recessed arms T T extend down, and the finger-bar is connected to them through a hinge-piece, D, similar in its details to that shown in Letters Patent heretofore issued to me. The gear-frame B is dish-shaped, u u, Fig. 1, to receive the main driving-gear, and also to secure the greatest strength with the least weight of metal. The hub b is of considerable length, and is finished on the inside to receive the axle H, and upon its outer surface to make a smooth bearing for the hub of the driving-wheel to turn upon. By this device I secure greater strength, and support the axle. If the gear-frame B were only supported by the axle outside of the hub of the driving-wheel, the axle would be easily bent by any sudden strain upon the frame when the finger-bar comes in contact with an obstruction. The hub b, extending through the wheel-hub a to the pawl-flange P, makes, with the axle H, a firm support for the frame B. This hub extends to and beyond the center of pole, which is the line of draft, and thereby prevents any strain from bending the axle within the length of the hub b.

The projection on the end of the brace-arm C is placed in the recess in the forward end of the pole-frame g, which holds it in place. On this end of the brace C, opposite the projection, is the rack N, into which meshes the segment of a gear, O, upon the end of the lever I, which is pivoted at i.

R is a latch-rod, which engages in the notches S S to hold the lever I in any desired position, the spring s keeping the rod R in the notch.

By operating the lever I the points of the fingers are turned up or down at pleasure, and held in any desired position by the latch-rod R.

Having thus described my invention, what I claim is—

1. The dish-shaped gear and finger-bar frame B, with the projecting-arms T T, and hub b.

2. The combination of the brace-arm C, arranged to extend around the driving-wheel, and secured to the pole or frame of the machine, with the gear and bar frame B, provided with an extended hub, b, which supports the frame B upon the axle H, and the hub a of the driving-wheel having its bearing upon the hub b of the gear and bar frame B, substantially as specified.

3. The gear and bar frame B, in combination with the brace-arm C, and its adjusting gears N and O, constructed substantially as described, for the purpose herein specified.

R. DUTTON.

Witnesses:
 MICHAEL RYAN,
 BENJAMIN W. HOFFMAN.